United States Patent
Hara et al.

(10) Patent No.: US 9,240,717 B2
(45) Date of Patent: Jan. 19, 2016

(54) SWITCHING POWER SUPPLY DEVICE AND ELECTRONIC APPLIANCE THEREWITH

(75) Inventors: Hideo Hara, Kyoto (JP); Yoshio Higashida, Kyoto (JP); Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 94 days.

(21) Appl. No.: 14/113,241

(22) PCT Filed: Apr. 19, 2012

(86) PCT No.: PCT/JP2012/060583
§ 371 (c)(1),
(2), (4) Date: Oct. 22, 2013

(87) PCT Pub. No.: WO2012/147609
PCT Pub. Date: Nov. 1, 2012

(65) Prior Publication Data
US 2014/0049237 A1  Feb. 20, 2014

(30) Foreign Application Priority Data
Apr. 25, 2011 (JP) ................................ 2011-097038

(51) Int. Cl.
*H02M 3/158* (2006.01)
*H02M 3/156* (2006.01)

(52) U.S. Cl.
CPC .............. *H02M 3/158* (2013.01); *H02M 3/156* (2013.01)

(58) Field of Classification Search
CPC ...... H04N 5/63; H02M 3/156; H02M 3/1563; H02M 3/1582; H02M 3/1588; H02M 1/08; H02M 2001/0022
See application file for complete search history.

(56) References Cited

U.S. PATENT DOCUMENTS

| | | | |
|---|---|---|---|
| 5,729,443 A * | 3/1998 | Pavlin | 363/21.12 |
| 6,911,808 B1 | 6/2005 | Shimamori | |
| 7,714,547 B2 | 5/2010 | Fogg et al. | |
| 7,782,039 B1 * | 8/2010 | He | 323/288 |
| 7,919,952 B1 * | 4/2011 | Fahrenbruch | 323/222 |

(Continued)

FOREIGN PATENT DOCUMENTS

| JP | 11-289753 | 10/1999 |
|---|---|---|
| JP | 2006-050843 | 2/2006 |

(Continued)

OTHER PUBLICATIONS

Japanese Patent Office, International Search Report for International Patent Application PCT/JP2012/060583 ( Jul. 17, 2012).

*Primary Examiner* — Timothy J Dole
*Assistant Examiner* — Alan Stewart
(74) *Attorney, Agent, or Firm* — Fish & Richardson P.C.

(57) ABSTRACT

Provided is a switching power source device in which fluctuation of the switching frequency can be suppressed without impairing the advantages of a non-linear control system. A switching power source device is provided with: switching control units of non-linear control type that generate an output voltage (out) from an input voltage (IN) by performing ON/OFF control of switching elements in accordance with the results of comparing a feedback voltage (FB) and reference voltage (REF); and an ON time setting unit that monitors switching voltage (SW) appearing at one end of the switch terminals, and sets the ON time (Ton) of the switching element in the switching control units based on the duty of the switching voltage (SW).

9 Claims, 10 Drawing Sheets

(56) References Cited

U.S. PATENT DOCUMENTS

| | | | |
|---|---|---|---|
| 8,183,848 B2 * | 5/2012 | Kuo | 323/285 |
| 2006/0125455 A1 * | 6/2006 | Tiew et al. | 323/282 |
| 2007/0145965 A1 * | 6/2007 | Oswald et al. | 323/286 |
| 2007/0200541 A1 | 8/2007 | Hachiya | |
| 2008/0024104 A1 | 1/2008 | Yamada | |
| 2008/0088284 A1 | 4/2008 | Weng | |
| 2008/0088292 A1 | 4/2008 | Stoichita et al. | |
| 2010/0019749 A1 | 1/2010 | Katsuya et al. | |

FOREIGN PATENT DOCUMENTS

| | | |
|---|---|---|
| JP | 2008-029159 | 2/2008 |
| JP | 2009-065753 | 3/2009 |
| JP | 2009-148155 | 7/2009 |
| JP | 2009-148157 | 7/2009 |
| JP | 2010-035316 | 2/2010 |
| JP | 2010-226930 | 10/2010 |

* cited by examiner

SWITCHING POWER SUPPLY DEVICE AND ELECTRONIC APPLIANCE THEREWITH

TECHNICAL FIELD

The present invention relates to a switching power supply device of a non-linear control type, and to an electronic appliance employing such a switching power supply device.

BACKGROUND ART

FIG. 8 shows a circuit block diagram and an operating waveform diagram of a conventional example of a switching power supply device that adopts a non-linear control method (here, a bottom-detecting, constant-on-period method). The switching power supply device shown in FIG. 8 is a step-down DC/DC converter of a synchronous rectification type which generates a desired output voltage OUT by stepping down an input voltage IN.

Examples of conventional technologies in this field are disclosed in Patent Documents 1 to 5 listed below

LIST OF CITATIONS

Patent Literature

Patent Document 1: Japanese Patent Application Publication No. 2008-29159
Patent Document 2: Japanese Patent Application Publication No. 2009-148155
Patent Document 3: Japanese Patent Application Publication No. 2009-148157
Patent Document 4: U.S. Pat. No. 7,714,547
Patent Document 5: Japanese Patent Application Publication No. 2010-226930

SUMMARY OF THE INVENTION

Technical Problem

A switching power supply device of a non-linear control type has the advantages of offering fast load response with a simple circuit configuration in comparison with a switching power supply device of a linear control type (for example, a voltage mode control type or a current mode control type).

However, with a switching power supply device of a non-linear control type, the switching frequency of the output transistor fluctuates greatly according to the input voltage VIN, the output voltage VOUT and the output current IOUT. Thus, a switching power supply device of a non-linear control type has the disadvantages of poor output voltage accuracy and poor load regulation performance (poor stability of the output voltage OUT against fluctuation in the load) in comparison with a switching power supply device of a linear control type.

Moreover, in cases where a switching power supply device of a non-linear control type is employed as a power supply in applications where the input voltage fluctuates greatly or where different output voltages are needed, it is necessary to take measures against EMI (electromagnetic interference) and noise so as to be able to cover a wide frequency range, and this makes it difficult to design products.

In view of the inconveniences experienced by the present inventors, an object of the present invention is to provide a switching power supply device that can suppress fluctuation in the switching frequency without spoiling the advantages of a non-linear control method, and to provide an electronic appliance incorporating such a switching power supply device.

Problem to be Solved by the Invention

To achieve the above object, according to one aspect of the present invention, a switching power supply device is provided with: a switching controller of a non-linear control type, for generating an output voltage from an input voltage by performing on/off control of a switching element according to the result of comparison of a feedback voltage with a reference voltage; and an on-period setter for monitoring the switch voltage appearing at an end of the switching element so as to set, based on the duty of the switch voltage, the on-period of the switching element in the switching controller (a first configuration).

In the switching power supply device of the first configuration described above, it is preferable that the on-period setter increase the on-period of the output transistor the higher the duty of the switch voltage is, and decrease the on-period of the output transistor the lower the duty of the switch voltage is (a second configuration).

In the switching power supply device of the second configuration described above, it is preferable that the on-period setter include: a first voltage generation circuit for generating a first voltage according to charging/discharging operation of a capacitor; a second voltage generation circuit for generating a second voltage according to the duty of the switch voltage; and a first comparator for generating a first control signal by comparing the first voltage with the second voltage (a third configuration).

In the switching power supply device of the third configuration described above, it is preferable that the first voltage generation circuit include: a constant-current source for generating a constant charge current that does not depend on the input voltage; a capacitor connected to the constant-current source; and a charge/discharge switch for switching between charging and discharging of the capacitor according to the on/off control of the switching element (a fourth configuration).

In the switching power supply device of the third or fourth configuration described above, it is preferable that the second voltage generation circuit include: a level shifter for shifting the level of the switch voltage; a buffer for shaping the waveform of the output of the level shifter; and a filter for generating the second voltage by smoothing the output of the buffer (a fifth configuration).

In the switching power supply device of the fifth configuration described above, it is preferable that the second voltage generation circuit include a current feedback portion for offsetting the second voltage according to the output current of the switching element (a sixth configuration).

In the switching power supply device of the sixth configuration described above, it is preferable that the current feedback portion include: a differential amplifier for differentially amplifying the voltage between both ends of the switching element; and an adder for adding the output of the differential amplifier to the second voltage (a seventh configuration).

In the switching power supply device of any of the third to seventh configurations described above, it is preferable that the switching controller include: a feedback voltage generator for generating the feedback voltage by dividing the output voltage; a reference voltage generator for generating the reference voltage; a second comparator for generating a second control signal by comparing the feedback voltage with the reference voltage; a flip-flop yielding an output signal of which the logical level switches according to the first and second control signals; and a driver for performing the on/off control of the switching element according to the output signal of the flip-flop.

Advantageous Effects of the Invention

According to the present invention, it is possible to provide a switching power supply device that can suppress fluctuation in the switching frequency without spoiling the advantages of a non-linear control method.

DESCRIPTION OF EMBODIMENTS

Figure 1:
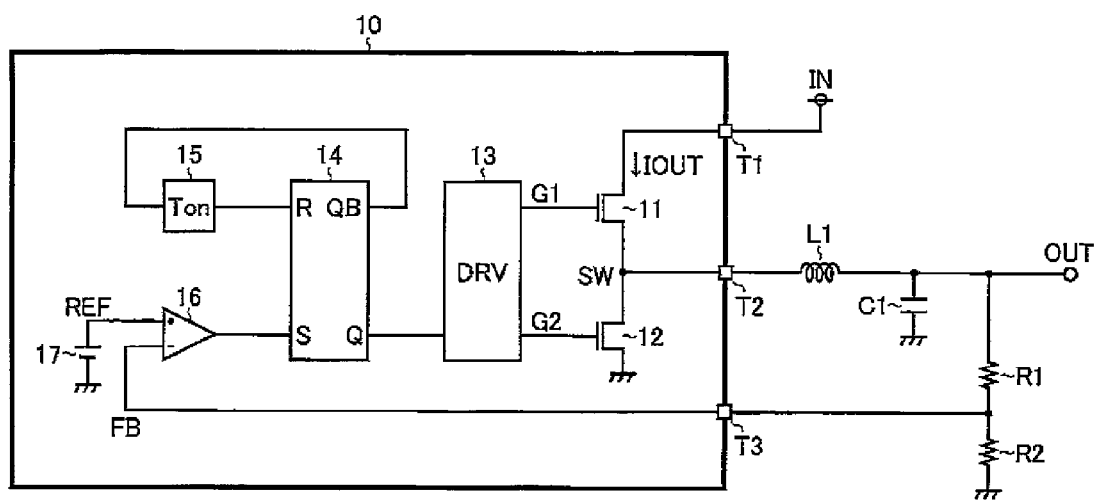
FIG. 1 is a block diagram showing an exemplary overall configuration of a switching power supply device.

<Overall Configuration>
FIG. 1 is a block diagram showing an exemplary overall configuration of a switching power supply device. The switching power supply device 1 of this exemplary configuration is a step-down DC/DC converter which generates an output voltage OUT from an input voltage IN by a non-linear control method (here, a bottom-detecting, constant-on-period method). The switching power supply device 1 has a semiconductor device 10 and discrete components (an inductor L1, a capacitor C1, and resistors R1 and R2) which are externally fitted to the semiconductor device 10.

The semiconductor device 10 has at least external terminals T1 to T3 for electrical connection with the outside. Outside the semiconductor device 10, the external terminal (source terminal) T1 is connected to a node to which the input voltage IN is applied. The external terminal (switch terminal) T2 is connected to a first end of the inductor L1. A second end of the inductor L1, a first end of the capacitor C1, and a first end of the resistor R1 are all connected to a node to which the output voltage OUT is applied. A second end of the capacitor C1 is connected to a ground node. A second end of the resistor R1 and a first end of the resistor R2 are both connected to the external terminal (feedback terminal) T3 of the switching power supply device 1. A second end of the resistor R2 is connected to the ground node. The resistors R1 and R2 function as a feedback voltage generator which yields, at the connection node between them, a feedback voltage FB which is a division voltage of the output voltage OUT.

The semiconductor device 10 is a so-called switching power supply IC which has integrated in it N-channel MOS field-effect transistors 11 and 12, a driver 13, an SR flip-flop 14, an on-period setter 15, a comparator 16, and a reference voltage generator 17.

The transistor 11 is an output transistor which is connected between the external terminals T1 and T2 and which is controlled to turn on and off according to a gate signal G1 fed from the driver 13. More specifically, in terms of interconnection, the drain of the transistor 11 is connected to the external terminal T1. The source of the transistor 11 is connected to the external terminal T2. The gate of the transistor 11 is connected to a node to which, the gate signal G1 is applied.

The transistor 12 is a synchronous rectification transistor which is connected between the external terminal T2 and the ground node and which is controlled to turn on and off according to a gate signal G2 fed from the driver 13. More specifically, in terms of interconnection, the drain of the transistor 12 is connected to the external terminal T2. The source of the transistor 12 is connected to the ground node. The gate of the transistor 12 is connected to a node to which the gate signal G2 is applied. As a rectifying element, a diode may be used instead of the transistor 12.

The driver 13 generates the gate signals G1 and G2 according to an output signal Q of the SR flip-flop 14 so as to control the switching of the transistors 11 and complementarily (exclusively). In the present description, the term "complementarily (exclusively)" refers not only to a configuration where the transistors 11 and 12 are turned on and off in a completely reverse fashion with respect to each other but also to a configuration where, with a view to preventing through current, the transistors 11 and 12 are turned on and off with a predetermined delay in their transition timing (a configuration where a period is secured in which the two transistors are simultaneously off).

The SR flip-flop 14 sets, i.e., turns to high level, its output signal Q at a rising edge in a set signal S fed from the comparator 16, and resets, i.e. turns to low level, the output signal Q at a rising edge in a reset signal R fed from the on-period setter 15.

After an inverting output signal QB of the SR flip-flop 14 is turned to low level, when a predetermined on-period Ton elapses, the on-period setter 15 generate a high-level trigger pulse in the reset signal R. The configuration and operation of the on-period setter 15 will be described in detail later.

The comparator 16 yields the set signal S by comparing the feedback voltage FB (a division voltage of the output voltage OUT), which is fed from the external terminal T3 (the connection node between the resistors R1 and R2) to an inverting input terminal (−) of the comparator 16, with a reference voltage REF, which is fed from the reference voltage generator 17 to a non-inverting input terminal (+) of the comparator 16. When the feedback voltage FB is higher than the reference voltage REF, the set signal S is at low level; when the feedback voltage FB is lower than the reference voltage REF, the set signal S is at high level.

The reference voltage generator 17 generates the reference voltage REF, which is constant irrespective of fluctuation in the input voltage IN or in the ambient temperature, by use of a band-gap circuit or the like.

Incidentally, the driver 13, the SR flip-flop 14, the comparator 16, and the reference voltage generator 17 mentioned above function as a switching controller of a non-linear control type which generates the output voltage OUT from the input voltage IN by turning switching elements (the transistors 11 and 12) according to the results of comparison of the feedback voltage FB with the reference voltage REF.

<On-Period Setter>
[First Exemplary Configuration]

Figure 2:
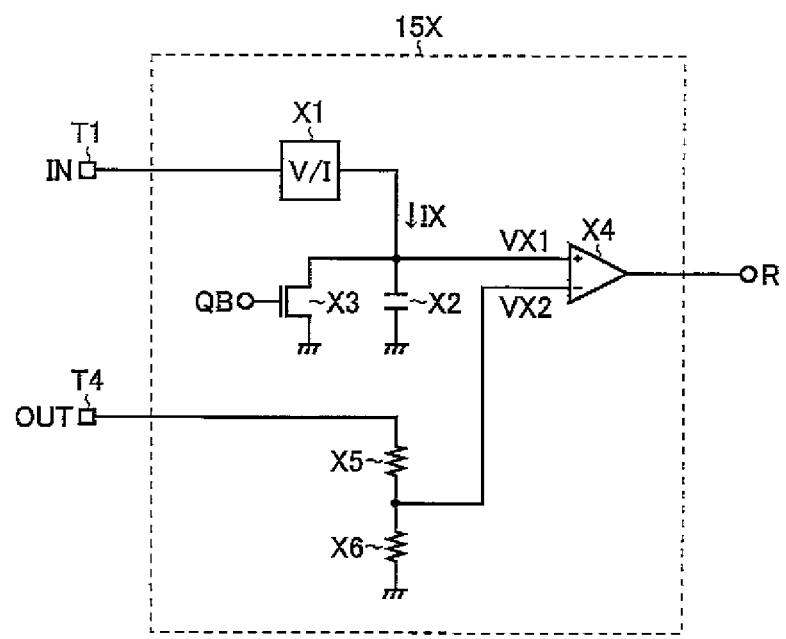
FIG. 2 is a diagram showing a first exemplary configuration of an on-period setter.

FIG. 2 is a diagram showing a first exemplary configuration of the on-period setter 15. The on-period setter 15X of the first exemplary configuration includes a voltage/current converter X1, a capacitor X2, an N-channel MOS field-effect transistor X3, a comparator X4, and resistors X5 and X6.

The voltage/current converter X1 generates a charge current IX (=A×IN) by performing voltage/current conversion on the input voltage IN which is applied to the external terminal T1. The current value of the charge current a fluctuates according to the voltage value of the input voltage IN. Specifically, the higher the input voltage IN is, the higher the charge current IX is; the lower the input voltage IN is, the lower the charge current IX is.

A first end of the capacitor X2 is connected to the voltage/current converter X1. A second end of the capacitor X2 is connected to the ground node. When the transistor X3 is off, the capacitor X2 is charged by the charge current IX, and a first voltage VX1 appearing at the first end of the capacitor X2 rises. On the other hand, when the transistor X3 is on, the capacitor X2 is discharged via the transistor X3, and the first voltage VX1 falls.

The transistor X3 is a charge/discharge switch which switches between charging and discharging of the capacitor X2 according to on/off control of the transistors 11 and 12. The drain of the transistor X3 is connected to the first end of the capacitor X2. The source of the transistor X3 is connected to the ground node. The gate of the transistor X3 is connected to a node to which the inverting output signal QB is applied.

The voltage/current converter X1, the capacitor X2, and the transistor X3 mentioned above correspond to a first voltage generation circuit which generates the first voltage VX1 according to the charging/discharging operation of the capacitor X2.

The comparator X4 generates the reset signal R by comparing the first voltage VX1 fed to its non-inverting input terminal (+) and a second voltage VX2 fed to its inverting input terminal (−). When the first voltage VX1 is higher than the second voltage VX2, the reset signal R is at high level; when the first voltage VX1 is lower than the second voltage VX2, the reset signal R is at low level.

A first end of the resistor X5 is connected to an external terminal T4 to which the output voltage OUT is applied. A second end of the resistor X5 is connected to a first end of the resistor X6. A second end of the resistor X6 is connected to the ground node. The resistors R1 and R2 correspond to a second voltage generation circuit which yields, at the connection node between them, the second voltage VX2 by dividing the output voltage OUT.

Figure 3:
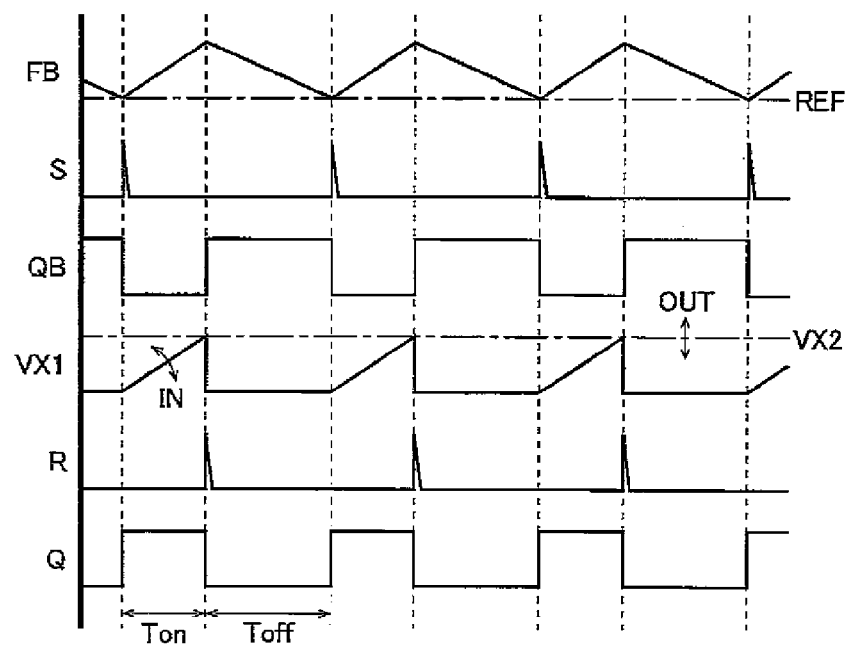
FIG. 3 is a timing chart illustrating on-period setting operation in the first exemplary configuration.

FIG. 3 is a timing chart illustrating on-period setting operation in the first exemplary configuration. FIG. 3 shows, from top, the feedback voltage FB, the set signal S, the inverting output signal QB, the first voltage VX1, the reset signal R, and the output signal Q.

During the off-period of the transistor 11, when the feedback voltage FB falls down to the reference voltage REF, the set signal S rises to high level, and this causes the output signal Q to turn to high level. Accordingly, the transistor 11 turns on, and the feedback voltage FB starts to rise. At this time, as the inverting output signal QB turns to low level, the transistor X3 turns off, and thus the capacitor X2 starts to be charged by the charge current IX. As described previously, the current value of the charge current IX fluctuates according to the voltage value of the input voltage N. Thus, the first voltage VX1 rises at a rate of increase (gradient) commensurate with the input voltage IN.

Thereafter, when the first voltage VX1 rises up to the second voltage VX2 (a division voltage of the output voltage OUT), the reset signal R rises to high level, and this causes the output signal. Q to turn to low level. Accordingly, the transistor 11 turns off, and the feedback voltage FB starts to fall again. At this time, as the inverting output signal QB turns to high level, the transistor X3 turns on. Thus, the transistor X3 is discharged quickly via the transistor X3, and this causes the first voltage VX1 to turn to low level.

The driver 13 generates the gate signals G1 and G2 according to the output signal Q, and uses them to perform on/off control of the transistors 11 and 12. As a result, a switch voltage SW having a rectangular waveform is fed out via the external terminal T2. The switch voltage SW is smoothed by the inductor L1 and the capacitor C1 to generate the output voltage OUT. The output voltage OUT is then divided by the resistors R1 and R2 to generate the feedback voltage FB mentioned previously. Through output feedback control as described above, the switching power supply device 1 can generate the output voltage OUT from the input voltage IN with an extremely simple configuration.

The on-period setter 15X sets the on-period Ton not as a constant value but as a value that fluctuates according to the input voltage IN and the output voltage OUT. More specifically, the higher the input voltage IN is, the on-period setter 15X increases the rate of increase (gradient) of the first voltage VX1 to shorten the on-period Ton; the lower the input voltage IN is, the on-period setter 15X decreases the rate of increase (gradient) of the first voltage VX1 to lengthen the on-period Ton.

With this configuration, it is possible, without spoiling the advantages of a non-linear control method, to suppress fluctuation in the switching frequency. It is thus possible to improve output voltage accuracy and load regulation performance, and to make it easy to take measures against EMI and noise in product design. It is also possible to use the switching power supply device 1 without trouble as a power supply in applications where the input voltage fluctuates greatly or where different output voltages are needed.

[Second Exemplary Configuration]

The on-period setter 15X of the first exemplary configuration described previously sets the on-period Ton by monitoring the input voltage IN and the output voltage OUT in order to suppress fluctuation in the switching frequency. Accordingly, the on-period setter 15X of the first exemplary configuration needs to be separately provided with the external terminal T4 for monitoring the output voltage OUT.

Moreover, the on-period setter 15X of the first exemplary configuration calculates the switching frequency f using an equation (1) that contains variables (the output voltage OUT, the input voltage IN, and the on-resistance RON of the transistors 11 and 12), and this makes it impossible to completely exclude fluctuation in the switching frequency f. Incidentally, in equation (1), C represents the capacitance value (constant) of the capacitor X2, and R5 and R6 represent the resistances (constants) of the resistors X5 and X6 respectively. Moreover, DUTY represents the duty of the switch voltage SW.

[Equation 1]

$$f = \frac{DUTY}{Ton} = \frac{\frac{OUT + IOUT \cdot RON}{IN}}{C \cdot OUT \cdot \frac{R6}{R5 + R6}} = \alpha \cdot \frac{OUT + IOUT \cdot RON}{OUT} \quad (1)$$

$$※ \ \alpha = \frac{A}{C \cdot \frac{R6}{R5 + R6}} \ (const.)$$

Figure 4:
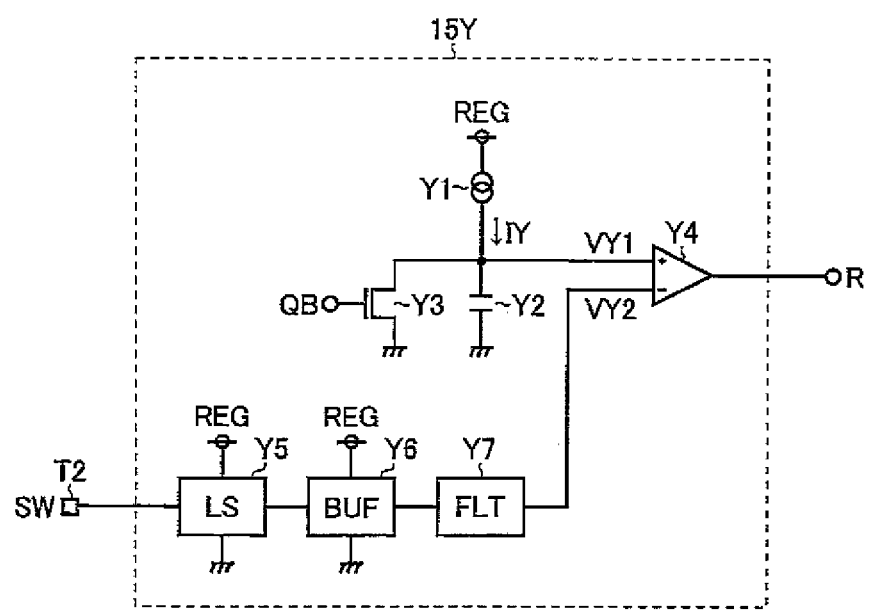
FIG. 4 is a diagram showing a second exemplary configuration of an on-period setter.

FIG. 4 is a diagram showing a second exemplary configuration of the on-period setter 15. The on-period setter 15Y of the second exemplary configuration includes a constant-current source Y1, a capacitor Y2, an N-channel MOS field-effect transistor Y3, a comparator Y4, a level shifter Y5, a buffer Y6, and a filter Y7. The second exemplary configuration is characterized in that it has the constant-current source Y1 in place of the voltage/current converter X1, and that it has the level shifter Y5, the buffer Y6, and the filter Y7 in place of the resistors X5 and X6.

The constant-current source Y1 operates by being fed with an internal supply voltage REG (for example, 5 V) which is constant irrespective of fluctuation in the input voltage IN or in the ambient temperature, and generates a constant charge current IY which does not depend on the input voltage IN.

A first end of the capacitor Y2 is connected to the constant-current source Y1. A second end of the capacitor Y2 is connected to the ground node. When the transistor Y3 is off, the capacitor Y2 is charged by the charge current IY, and a first voltage VY1 appearing at the first end of the capacitor Y2 rises. On the other hand, when the transistor Y3 is on, the capacitor Y2 is discharged via the transistor Y3, and the first voltage VY1 falls.

The transistor Y3 is a charge/discharge switch which switches between charging and discharging of the capacitor Y2 according to on/off control of the transistors 11 and 12. The drain of the capacitor Y2 is connected to the first end of the capacitor Y2. The source of the transistor Y3 is connected to the ground node. The gate of the transistor Y3 is connected to a node to which the inverting output signal QB is applied.

The constant-current source Y1, the capacitor Y2, and the transistor Y3 mentioned above correspond to a first voltage generation circuit which generates the first voltage VY1 according to the charging/discharging operation of the capacitor Y2.

The comparator Y4 generates the reset signal R by comparing the first voltage VY1 fed to its non-inverting input terminal (+) with a second voltage VY2 fed to its inverting input terminal (−). When the first voltage VY1 is higher than the second voltage VY2, the reset signal R is at high level; when the first voltage VY1 is lower than the second voltage VY2, the reset signal R is at low level.

The level shifter Y5 operates by being fed with the internal supply voltage REG, and shifts the level of the switch voltage SW applied to the external terminal T2. Specifically, the level shifter Y5 receives the switch voltage SW, which is driven to pulsate between the input voltage IN (more precisely, IN−IOUT×RON) and the ground voltage GND, and yields a voltage signal which is driven to pulsate between the internal supply voltage REG and the ground voltage GND. The withstand voltage of the components of the level shifter Y5 is determined appropriately according to the voltage difference between the input voltage IN and the internal supply voltage REG.

The buffer Y6 operates by being fed with the internal supply voltage REG, and shapes the waveform of the output of the level shifter Y5. The buffer Y6 may be omitted in a case where higher priority is given to reducing the circuit scale of the on-period setter 15Y.

The filter Y7 smooths the output of the buffer Y6 to generate the second voltage VY2. As the buffer Y6, a CR filter composed of a capacitor and a resistor or the like may be used.

The level shifter Y5, the buffer Y6, and the filter Y7 correspond to a second voltage generation circuit which generates the second voltage VY2 commensurate with the duty of the switch voltage SW.

Figure 5:
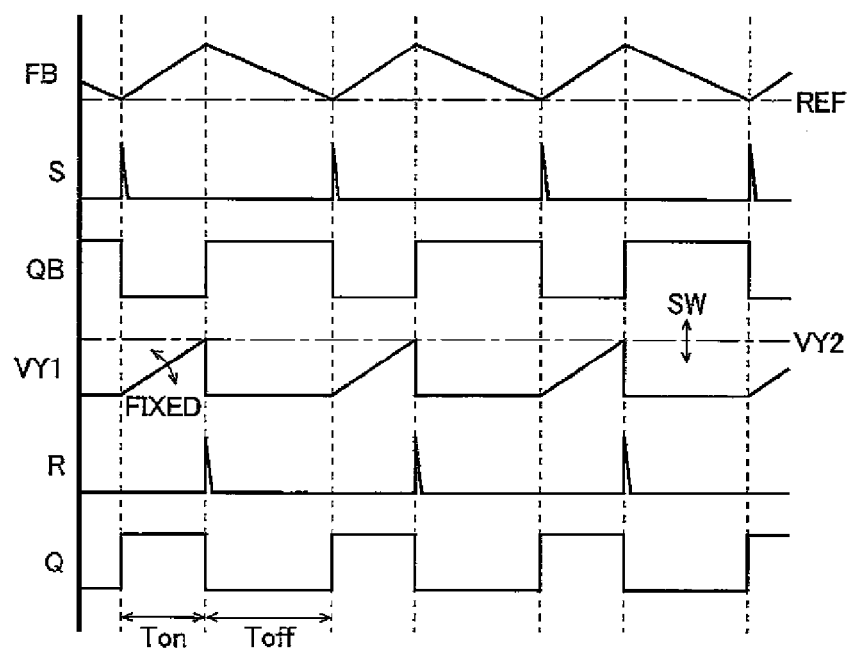
FIG. 5 is a timing chart illustrating on-period setting operation in the second exemplary configuration.

FIG. 5 is a timing chart illustrating the on-period setting operation in the second exemplary configuration. FIG. 5 shows, from top, the feedback voltage FB, the set signal S, the inverting output signal QB, the first voltage VY1, the reset signal R, and the output signal Q.

During the off-period of the transistor 11, when the feedback voltage FB falls down to the reference voltage REF, the set signal S rises to high level, and this causes the output signal Q to turn to high level. Accordingly, the transistor 11 turns on, and the feedback voltage FB starts to rise. At this time, as the inverting output signal QB turns to low level, the transistor Y3 turns off, and thus the capacitor Y2 starts to be charged by the charge current IY. As described previously, the current value of the charge current IY is constant and does not depend on the input voltage IN. Thus, the first voltage VY1 rises at a constant rate of increase (gradient) which does not depend on the input voltage IN.

Thereafter, when the first voltage VY1 rises up to the second voltage VY2 (a virtual output voltage OUT of which the voltage value fluctuates according to the duty of the switch voltage SW), the reset signal R rises to high level, and this causes the output signal Q to turn to low level. Accordingly, the transistor 11 turns off, and the feedback voltage FB starts to fall again. At this time, as the inverting output signal QB turns to high level, the transistor Y3 turns on. Thus, the capacitor Y2 is discharged quickly via the transistor Y3, and this causes the first voltage VY1 to fall to low level.

The driver 13 generates the gate signals G1 and G2 according to the output signal Q, and uses them to perform on/off control of the transistors 11 and 12. As a result, a switch voltage SW having a rectangular waveform is fed out via the external terminal T2. The switch voltage SW is smoothed by the inductor L1 and the capacitor C1 to generate the output voltage OUT. Incidentally, the output voltage OUT is divided by the resistors R1 and R2 to generate the feedback voltage FB mentioned previously. Through output feedback control as described above, the switching power supply device 1 can generate the output voltage OUT from the input voltage IN with an extremely simple configuration. In this respect, the second exemplary configuration is no different from the first exemplary configuration described previously.

Moreover, the on-period setter 15Y sets the on-period Ton not as a constant value but as a value that fluctuates according to the duty of the switch voltage SW. More specifically, the higher the duty of the switch voltage SW is, the on-period setter 15Y increases the second voltage VY2 to lengthen the on-period Ton; the lower the duty of the switch voltage SW is, the on-period setter 15Y decreases the second voltage VY2 to shorten the on-period Ton. For example, when a rise in the input voltage IN or a drop in the output voltage OUT, or an increase in the output current TOUT, causes the duty of the switch voltage SW to increase, the second voltage VY2 is raised to lengthen the on-period Ton. By contrast, when a drop in the input voltage IN or a rise in the output voltage OUT, or a decrease in the output current IOUT, causes the duty of the switch voltage SW to decrease, the second voltage VY2 is lowered to shorten the on-period Ton.

With this configuration, as with the first exemplary configuration described previously, it is possible, without spoiling the advantages of a non-linear control method, to suppress fluctuation in the switching frequency. It is thus possible to improve output voltage accuracy and load regulation performance, and to make it easy to take measures against EMI and noise in product design. It is also possible to use the switching power supply device 1 without trouble as a power supply in applications where the input voltage fluctuates greatly or where different output voltages are needed.

Moreover, the on-period setter 15Y of the second exemplary configuration sets the on-period Ton by monitoring the switch voltage SW in order to suppress fluctuation in the switching frequency. Accordingly, unlike in the first exemplary configuration described previously, the semiconductor device 10 does not have to be provided separately with the external terminal T4 for monitoring the output voltage OUT.

Moreover, the on-period setter 15Y of the second exemplary configuration calculates the switching frequency f using an equation (2) that contains no variable at all, and this makes it possible to completely exclude fluctuation in the switching frequency f. Incidentally, in equation (2), C represents the capacitance value (constant) of the capacitor Y2, and DUTY represents the duty of the switch voltage SW.

[Equation 2]

$$f = \frac{DUTY}{Ton} = \frac{DUTY}{\frac{REG \cdot C \cdot DUTY}{IY}} = \frac{IY}{REG \cdot C} = \beta(const.) \quad (2)$$

[Third Exemplary Configuration]

Figure 6:
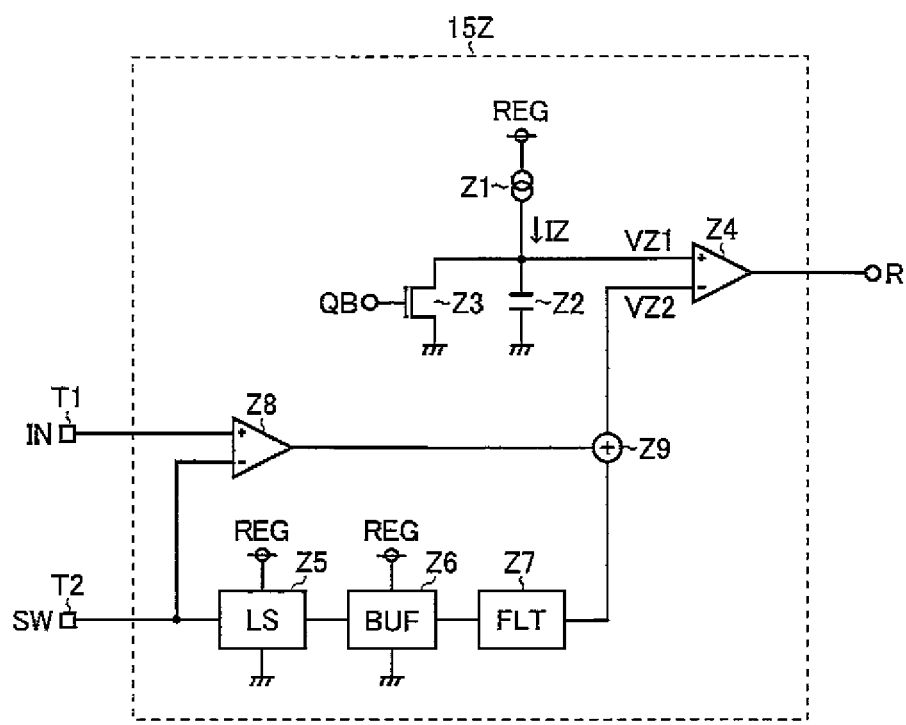
FIG. 6 is a diagram showing a third exemplary configuration of an on-period setter.

FIG. 6 shows a third exemplary configuration of the on-period setter 15. The on-period setter 15Z of the third exemplary configuration includes a constant-current source Z1, a capacitor Z2, an N-channel MOS field-effect transistor Z3, a comparator Z4, a level shifter Z5, a buffer Z6, a filter Z7, a differential amplifier Z8, and an adder Z9.

In FIG. 6, the components and elements identified by the reference signs Z1 to Z7, IZ, VZ1, and VZ2 are basically identical with those identified by the reference signs Y1 to Y7, IY, VY1, and VY2 respectively in FIG. 4, and therefore no overlapping description will be repeated. The following description proceeds with focus placed on the newly added components in the third exemplary configuration, namely the differential amplifier Z8 and the adder Z9.

The differential amplifier Z8 generates an offset voltage by differentially amplifying the differential voltage (the drain-source voltage Vds of the transistor 11) between the input voltage IN, which is applied from the external terminal T1 to the non-inverting input terminal (+) of the differential amplifier Z8, and the switch voltage SW, which is applied from the external terminal T2 to the inverting input terminal (−) of the differential amplifier Z8. The drain-source voltage Vds during the on-period of the transistor 11 fluctuates according to the output current TOUT (Vds=IN−TOUT×RON). Accordingly, the above-mentioned offset voltage generated during the on-period of the transistor 11 is higher the higher the output current IOUT is, and is lower the lower the output current IOUT is.

The adder Z9 adds the output of the differential amplifier Z8 to the second voltage VZ2 (the output of the filter Z7). Accordingly, the second voltage VZ2 fed in to the comparator Z4 is higher the higher the output current IOUT is, and is lower the lower the output current IOUT is.

The differential amplifier Z8 and the adder Z9 mentioned above correspond to a current feedback portion which offsets the second voltage VZ2 according to the output current IOUT passing through the transistor 11.

Figure 7:
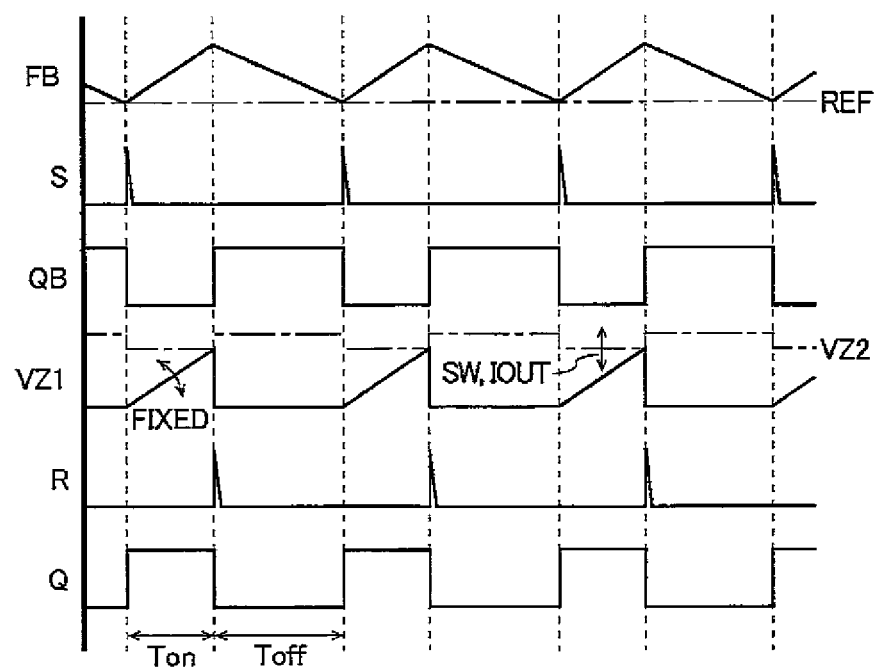
FIG. 7 is a timing chart illustrating on-period setting operation in the third exemplary configuration.
Figure 8:
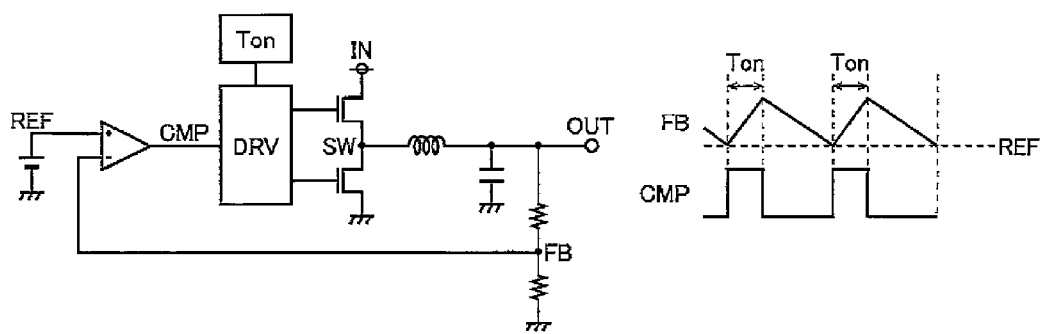
FIG. 8 is a diagram showing a conventional example of a switching power supply device.

FIG. 7 is a timing chart illustrating the on-period setting operation in the third exemplary configuration. FIG. 7 shows, from top, the feedback voltage FB, the set signal S, the inverting output signal QB, the first voltage VZ1, the reset signal R, and the output signal Q. For such operation as finds similar operation in the second exemplary configuration, no overlapping description will be repeated, and the following description proceeds with focus placed on operation peculiar to the third exemplary configuration.

The on-period setter 15Z is so configured that the second voltage VZ2, of which the voltage value fluctuates according to the duty of the switch voltage SW, is further given an offset according to the result of monitoring of the output current IOUT. More specifically, the higher the output current IOUT is, the on-period setter 15Z increases the offset voltage given to the second voltage VZ2 to lengthen the on-period Ton; the lower the output current IOUT is, the on-period setter 15Z decreases the offset voltage given to the second voltage VZ2 to shorten the on-period Ton.

With this configuration, as with the first and second exemplary configurations described previously, it is possible, without spoiling the advantages of a non-linear control method, to suppress fluctuation in the switching frequency. It is thus possible to improve output voltage accuracy and load regulation performance, and to make it easy to take measures against EMI and noise in product design. It is also possible to use the switching power supply device 1 without trouble as a power supply in applications where the input voltage fluctuates greatly or where different output voltages are needed.

Moreover, the on-period setter 15Z of the third exemplary configuration has the current feedback portion (Z8 and Z9) for adjusting the on-period Ton by directly feeding back the result of monitoring of the output current IOUT. Thus, in comparison with the second exemplary configuration, it is not possible to make the equation for calculating the switch voltage SW f completely constant, but it is possible to cope with abrupt fluctuation in the output current IOUT.

Incidentally, during the off-period of the transistor 11, the switch voltage SW falls to close to the ground voltage GND, producing an extremely large offset in the second voltage VZ2. However, during the off-period of the transistor 11, the capacitor Z2 is discharged and the first voltage VZ1 is kept at low level (the ground voltage GND). Accordingly, the first voltage VZ1 all the while remains lower than the second voltage VZ2 irrespective of the offset in the second voltage VZ2. Thus, fluctuation in the offset in the second voltage VZ2 during the off-period of the transistor 11 does not adversely affect the generation of the reset signal R.

<Application to Televisions and Set-Top Boxes>

Figure 9:
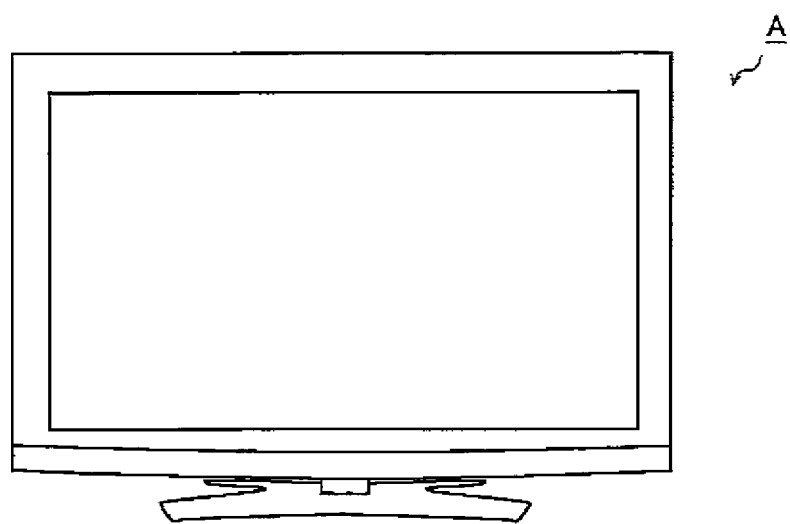
FIG. 9 is an external appearance view of a television receiver incorporating a switching power supply device.
Figure 10:
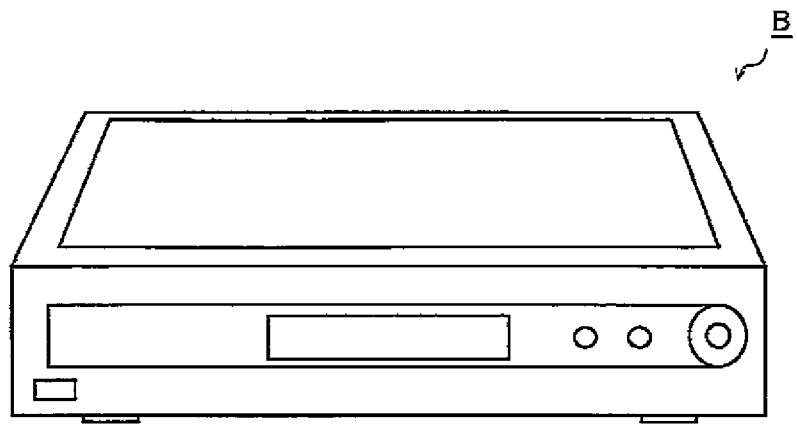
FIG. 10 is an external appearance view of a set-top box incorporating a switching power supply device.

FIGS. 9 and 10 are external appearance views of a television receiver and a set-top box, respectively, each incorporating a switching power supply device. The television receiver A and the set-top box B each have a power supply which supplies electric power to different sections in them. As the power supply here, any of the switching power supply devices described previously can be employed suitably.

The television receiver A may be one provided with a liquid crystal display, or one provided with a plasma display.

The set-top box B may be one provided simply with functions for broadcast signal format conversion and for unscrambling, or one additionally provided with functions for recording and playing back broadcast signals and for playing back from Blu-ray discs.

It should be understood that the television receiver A and the set-top box B are merely examples of electronic appliances incorporating switching power supply devices as described previously; the switching power supply devices described previously find wide applications in a variety of electronic appliances.

Modified Examples

Although the embodiments described above deal with examples where the present invention is applied to a step-down switching power supply device of a synchronous rectification type, this is not meant to limit the scope of application of the present invention. Switching may instead be realized by adopting a asynchronous rectification method, or the output stage of the switching power supply device may be configured as a step-up type or a step-up and -down type.

Thus, the present invention allows for many modifications and variations from the embodiments described above within the spirit of the invention. That is, it should be understood that the embodiments described above are in every aspect illustrative and not restrictive, and that the technical scope of the present invention is defined not by the description of the embodiments given above but by the appended claims, encompassing any modifications and variations made within the sense and scope equivalent to those of the claims.

INDUSTRIAL APPLICABILITY

Switching power supply devices according to the present invention can be employed as power supplies incorporated in a variety of electronic appliances, such as liquid crystal displays, plasma displays, BD recorders/players, and set-top boxes.

LIST OF REFERENCE SIGNS 1 switching power supply device
10 semiconductor device (switching power supply IC)
11 N-channel MOS field-effect transistor (output transistor)
12 N-channel MOS field-effect transistor (synchronous rectification transistor)
13 driver
14 SR flip-flop
15 (15X, 15Y, 15Z) on-period setter
16 comparator
17 reference voltage generator
L1 inductor
R1, R2 resistor
C1 capacitor
T1-T4 external terminal
X1 voltage/current converter
X2 capacitor
X3 N-channel MOS field-effect transistor
X4 comparator
X5, X6 resistor
Y1, Z1 constant-current source
Y2, Z2 capacitor
Y3, Z3 N-channel MOS field-effect transistor
Y4, Z4 comparator
Y5, Z5 level shifter
Y6, Z6 buffer
Y7, Z7 filter (CR filter)
Z8 differential amplifier
Z9 adder
A television receiver
B set-top box

The invention claimed is:

1. A switching power supply device comprising:
a switching controller of a non-linear control type, for generating an output voltage from an input voltage by performing on/off control of a switching element according to a result of comparison of a feedback voltage with a reference voltage; and
an on-period setter for monitoring a switch voltage appearing at an end of the switching element so as to set, based on a duty of the switch voltage, an on-period of the switching element in the switching controller,
wherein the on-period setter increases the on-period of the switching element the higher the duty of the switch voltage is, and decreases the on-period of the switching element the lower the duty of the switch voltage is,
wherein the on-period setter includes:
a first voltage generation circuit for generating a first voltage according to charging/discharging operation of a capacitor;
a second voltage generation circuit for generating a second voltage according to the duty of the switch voltage; and
a first comparator for generating a first control signal by comparing the first voltage with the second voltage,
wherein the first voltage generation circuit includes:
a constant-current source for generating a constant charge current that does not depend on the input voltage;
a capacitor connected to the constant-current source; and
a charge/discharge switch for switching between charging and discharging of the capacitor according to the on/off control of the switching element,
wherein the second voltage generation circuit includes:
a level shifter for shifting a level of the switch voltage;
a buffer for shaping a waveform of an output of the level shifter; and
a filter for generating the second voltage by smoothing an output of the buffer, and
wherein the constant-current source and the level shifter operate by being fed with a same internal supply voltage.

2. The switching power supply device according to claim 1, wherein the second voltage generation circuit includes a current feedback portion for offsetting the second voltage according to an output current of the switching element.

3. The switching power supply device according to claim 2, wherein the current feedback portion includes:
a differential amplifier for differentially amplifying a voltage between both ends of the switching element; and
an adder for adding an output of the differential amplifier to the second voltage.

4. The switching power supply device according to claim 1, wherein the switching controller includes:
a feedback voltage generator for generating the feedback voltage by dividing the output voltage;
a reference voltage generator for generating the reference voltage;
a second comparator for generating a second control signal by comparing the feedback voltage with the reference voltage;
a flip-flop yielding an output signal of which a logical level switches according to the first and second control signals; and
a driver for performing the on/off control of the switching element according to the output signal of the flip-flop.

5. An electronic appliance comprising the switching power supply device according to claim 1 as a power supply for supplying electric power to different sections in the appliance.

6. The electronic appliance according to claim 5, wherein the electronic appliance is a television receiver.

7. The electronic appliance according to claim 5, wherein the electronic appliance is a set-top box.

8. The electronic appliance according to claim 1 wherein the level shifter is arranged to receive the switch voltage and to generate as its output a voltage signal that is driven to pulsate between the internal supply voltage and a predetermined voltage.

9. The electronic appliance according to claim 8 wherein the predetermined voltage is ground.

* * * * *